Sept. 11, 1928.
C. MACMILLAN
1,684,236
SYSTEM OF ELECTRIC SHIP PROPULSION
Filed March 14, 1923
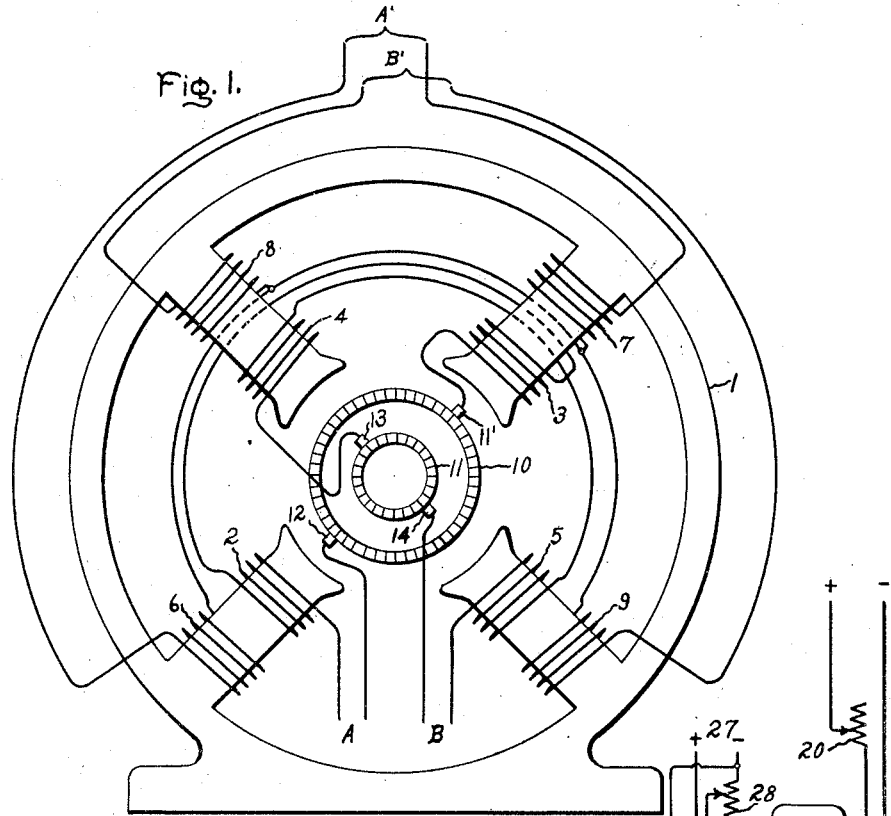
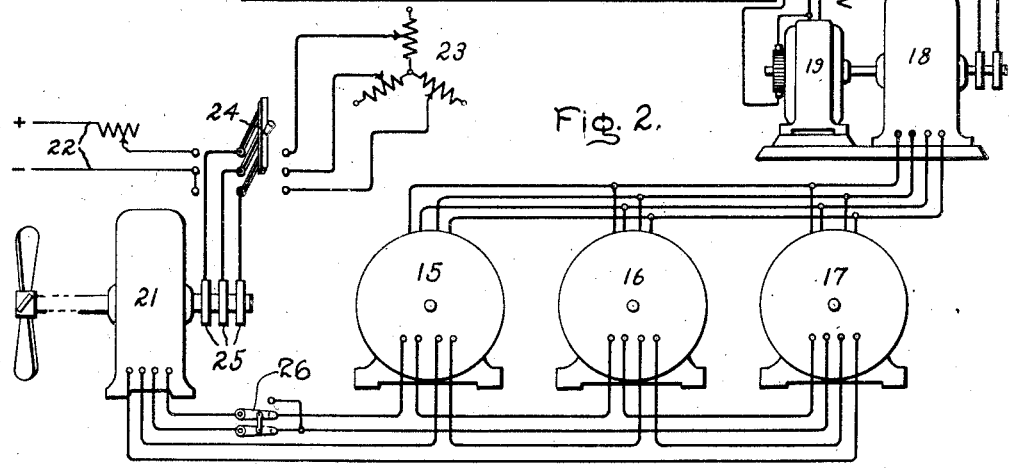
Inventor:
Campbell Macmillan Patented Sept. 11, 1928.

1,684,236

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

SYSTEM OF ELECTRIC SHIP PROPULSION.

Application filed March 14, 1923. Serial No. 624,988.

My invention relates to electric power systems and especially to systems of electric ship propulsion in which one or more propeller motors are supplied with power from a plurality of generators driven by separate prime movers subject to variations in speed and driving torque.

On account of its high efficiency the Diesel engine is utilized as the prime mover in a large number of vessels, being in some cases directly connected to the propeller shaft and in others utilized to drive direct current generators from which power is supplied to a direct current propeller motor or motors. The direct connected Diesel engine, which is characterized by its low speed and large heavy parts, has not proven entirely satisfactory in large units because of its lack of flexibility in maneuvering and also due to the difficulty of making adjustments and repairs which require the handling of large heavy parts.

Heretofore the only acceptable form of electrical equipment for use with Diesel engines has utilized direct current generators and motors. This equipment furnishes ideal conditions for the control of the motor torque and speed, and connection of the generators in series permits variation in the engine loads without appreciable effect on the operation of the propeller motor. No similar alternating current system has been proposed which would retain these desirable features and at the same time make it possible to secure the advantages common to alternating current apparatus which, as compared with direct current apparatus, is lighter in weight, has higher efficiency, and does not require the use of commutators. In a system of this character, the advantages of omitting a commutator applies more especially to the motor which is not only larger than the generating units but is apt to be placed further aft in the ship where it is not subject to the same close supervision as the generators which are located in the engine room and under the continual inspection of the engine room staff.

An object of my invention, therefore, is to provide a power system which combines the advantages of flexibility in torque and speed control with high efficiency and freedom from commutation difficulties.

A further object of my invention is to provide a system of ship propulsion in which are combined the advantages of Diesel electric drive by direct current apparatus and those common to the utilization of alternating current apparatus.

My invention will be better understood from the following description taken in connection with the accompanying drawing and its scope will be pointed out in the appended claims.

Referring now to the drawing, Fig. 1 shows a type of generator which may be utilized in connection with my invention; and Fig. 2 shows the embodiment of my invention in a system of ship propulsion.

The generator shown in Fig. 1 is of the two-phase, alternating current, series compensated, separately excited, commutator type, the stator 1 being provided with series compensating coils 2 and 3 connected in phase A and like coils 4 and 5 connected in phase B. These compensating coils are capable of carrying full load current and may be connected in series with the rotor circuit to give 100 per cent compensation in each phase. The stator 1 is also provided with shunt excitation coils 6 and 7, and 8 and 9 connected to phases A' and B' respectively of a suitable two-phase system. These shunt coils are provided with a number of turns appropriate to the characteristics of the source from which they are supplied with current. The rotor is provided with two independent single phase distributed windings connected to commutators 10 and 11 respectively which may be placed at opposite ends of the rotor. The series compensating windings 2 and 3 are connected to the brush 11' so that phase A is connected in series with the commutator 10 through brushes 11' and 12. The windings 4 and 5 are likewise connected to brush 13 thereby connecting phase B in series with the commutator 11 through brushes 13 and 14. In Fig. 1 the generator is illustrated as provided with salient poles for the purpose of more clearly indicating its construction. In an actual construction, distributed windings would be preferable for reasons well understood by those skilled in the art.

The generators 15, 16 and 17 of Fig. 2 are each constructed as shown in Fig. 1 and are each driven by a separate prime mover (not shown). A two-phase synchronous machine 18 driven by the variable speed direct current motor 19 is arranged to supply current to the shunt field windings 6, 7, 8 and 9 of each generator, like phases of the different generators being shown as connected in parallel with each other to the machine 18. In lieu of this arrangement the field coils in like phases may be connected in series if desired. The rheostat 20 in the field circuit of the machine 18 is provided for adjusting the excitation of the generators. The frequency of the current delivered by the machine 18 and consequently the speed at which the motor 21 is driven is controlled in response to speed variations of the direct current motor 19 which is supplied from a direct current source 27 and is provided with a rheostat 28 arranged to control its speed of rotation. If the generator brushes are set to give 100 per cent compensation, the exciting current will be unaffected by the main load current and the machine 18 will supply generator excitation at zero power factor.

The different generators have their like phases connected in series with each other to the corresponding phases of a two-phase propeller motor 21 which may be either of the synchronous or induction type. This motor is shown as provided with slip rings 25 through which its secondary winding may be connected to a source of direct current 22 when the switch 24 is closed to the left, or to a regulating resistance 23 when this switch is closed to the right, thereby giving either synchronous or induction operation of the propeller motor as may be desired. In the case of induction motor operation, the required K. V. A. excitation for the motor 21 will of course be supplied by the machine 18 which may be overexcited to maintain the system at unity power factor. In the case of synchronous motor operation, the machine 18 is of course required to furnish excitation for the generators only. The normal operating frequency of the system will be determined to some extent by the characteristics of the particular apparatus which is utilized in each case.

In the operation of my system of ship propulsion, the speed at which the propeller motor 21 rotates is determined by the speed of the motor 19 which is controlled in response to manipulation of the resistor 28. Upon an increase in the speed of the pilot motor 19, the frequency of the current supplied by the generators will increase and a corresponding increase will be produced in the speed of the propeller motor, the motor and generator fields being adjusted to give adequate torque and a suitable operating power factor. If the propeller motor is operated as a synchronous motor, reversal of the direction in which the ship is driven is preferably effected by reducing the frequency of the current supplied to the motor and thereafter opening the motor field and closing the switch 24 to the right to increase the secondary resistance of the propeller motor and operating a reversing switch 26 in the main supply circuit to reverse the phase rotation of the motor, the induction motor characteristics of the motor being relied upon to bring the motor to standstill and to bring it almost up to synchronous speed in the opposite direction. The field of the motor may then be connected to the direct current source and the pilot motor manipulated to increase the speed of the propeller motor. On account of the low frequencies obtainable, the conditions for reversal are especially favorable. During reversal, overexcitation is desirable to increase the motor torque and a considerable proportion of the extra energy required for excitation during reversal may be furnished by the flywheel effect of the synchronous machine 18. Any desired degree of overexcitation may be produced by adjusting resistance 20. If desired, the operation may also be assisted by introducing a permanent compounding effect in the generator by shifting the brushes.

It will be apparent to those skilled in the art that my invention may be embodied in other forms than those shown and described and I therefore intend by the appended claims to cover all changes and modifications within the spirit of my invention.

What I claim as new and desire to secure by Letters Patent of the United States, is:

1. A system of ship propulsion comprising a polyphase propeller motor, a plurality of polyphase alternating current generators independently driven by prime movers subject to variations in speed and driving torque, and means for connecting each of the phase windings of said motor in series with a corresponding phase winding of each of said generators whereby fluctuations of power generation in each prime mover may be absorbed directly by the main motor and propeller in such manner as to avoid interference with the steady production of power by the remaining generators.

2. A system of ship propulsion comprising a plurality of independently driven polyphase alternating current commutator generators having their generating windings connected in a series circuit, a polyphase alternating current motor adapted to be supplied with current from said generators and connected in said series circuit, and exciting means for supplying excitation to said generators and regulating the speed of said motor.

3. A system of ship propulsion comprising a plurality of alternating current generators having their generating windings connected in a series circuit, propeller driving means adapted to be supplied with current from said generators and connected in said series circuit, and means arranged to supply exciting current of variable frequency to said generators whereby the speed of said driving means may be controlled.

4. A system of ship propulsion comprising a plurality of alternating current generators having their generating windings connected in a series circuit, an alternating current motor adapted to be supplied with power from said generators and connected in said series circuit, a synchronous machine arranged to supply exciting current of variable frequency to said generators for controlling the frequency of the current delivered by said generators and thereby regulating the speed of said motor, and a variable speed pilot motor for controlling the speed of said synchronous machine.

5. A system of ship propulsion comprising a plurality of polyphase alternating current generators adapted to be driven by prime movers subject to variations in speed and driving torque and having their like phase windings connected in series, a polyphase alternating current propeller motor having each of its phase windings connected in series with a corresponding phase winding of each generator, and a polyphase exciting machine for exciting said generators and controlling the speed of said motor.

6. In a system of ship propulsion a plurality of independently driven polyphase alternating current commutator generators having their generating windings connected in a series circuit and arranged to be driven by prime movers subject to variations in speed and driving torque, a propeller motor connected in series with said generators, means for controlling the excitation of said motor, a synchronous machine for exciting said generators, a rheostat in the field circuit of said machine for controlling the value of the exciting current supplied to said generators by said machine, and a variable speed pilot motor arranged to drive said machine for controlling the frequency of the current delivered to said propeller motor.

In witness whereof, I have hereunto set my hand this 9th day of March, 1923.

CAMPBELL MACMILLAN.